United States Patent [19]
Tanabe

[11] Patent Number: 5,555,827
[45] Date of Patent: Sep. 17, 1996

[54] SEWING MACHINE INCLUDING A LASER CUTTING SYSTEM, A SEWING METHOD, AND AN EMBROIDERING METHOD

[75] Inventor: Tokuyoshi Tanabe, Kagawa, Japan

[73] Assignee: Kabushiki Kaisha Tanabe Shishu, Kagawa, Japan

[21] Appl. No.: 277,312

[22] Filed: Jul. 22, 1994

[30] Foreign Application Priority Data

Jul. 28, 1993 [JP] Japan .................................. 5-186138
Oct. 28, 1993 [JP] Japan .................................. 5-270721
Jul. 1, 1994 [JP] Japan .................................. 6-150992

[51] Int. Cl.$^6$ ........................................ D05B 21/00
[52] U.S. Cl. ........................ 112/102.5; 112/470.05; 112/475.19; 219/121.67
[58] Field of Search .................... 112/121.12, 103, 112/155, 163, 262.3, 266.1, 102.5, 470.06, 470.05, 470.07, 475.09, 475.128, 475.19; 408/701; 83/910; 219/121.67, 121.72

[56] References Cited

U.S. PATENT DOCUMENTS 4,685,408  8/1987  Frye ............................... 112/262.3
5,205,232  4/1993  Sadeh et al. .................... 112/262.3
5,230,764  7/1993  Moll ............................. 112/262.3 X
5,367,141  11/1994  Piltch ............................ 219/121.67

FOREIGN PATENT DOCUMENTS 6-33550  5/1994  Japan .

*Primary Examiner*—Peter Nerbun
*Attorney, Agent, or Firm*—Wenderoth, Lind & Ponack

[57] ABSTRACT

A base sheet is laid on a back sheet and then is cut in a prescribed shape without cutting the back sheet. Embroidery then is made along the periphery of the base sheet. A sewing machine including a laser cutting system of the present invention is provided with a needle bar movable in a vertical direction; a sheet holding frame movable in directions in an X-Y plane a laser oscillator for oscillating laser light, and a sewing machine table. For a cutting process, vertical movement of the needle bar is stopped, the sheet holding frame is successively moved in the X-Y plane, and the laser oscillator successively oscillates laser light. While the sheet holding frame is thus successively moved on the sewing table, the base sheet is accurately cut in a prescribed shape with the laser light. Thereafter, for an embroidering process, the needle bar is moved in the vertical direction, the sheet holding frame is intermittently moved in the X-Y plane in synchronization with the vertical movement of the needle bar, and finally embroidery is made along the periphery of the base sheet.

5 Claims, 6 Drawing Sheets

SEWING MACHINE INCLUDING A LASER CUTTING SYSTEM, A SEWING METHOD, AND AN EMBROIDERING METHOD

BACKGROUND OF THE INVENTION

1. Field of the Invention

The present invention relates to a sewing machine including a laser cutting system capable of successively and accurately cutting a sheet of cloth, leather, or the like. Furthermore, the present invention relates to a sewing method and an embroidering method preferably to be carried out using such a sewing machine. More particularly, the present invention relates to a sewing machine including a laser cutting system, to be used for smoothly and accurately sewing a plurality of sheets together, or for making embroidery in an openwork pattern or a stitch pattern along a periphery of the sheet or along a periphery of an opening formed in the sheet. In addition, the present invention relates to a sewing method and an embroidering method preferably to be carried out using such a sewing machine.

2. Description of the Prior Art

For making embroidery in an openwork pattern or the like along a periphery of a base sheet of cloth, leather or the like, or along a periphery of an opening formed in the base sheet, a back sheet is required to entwine with embroidery threads at portions where the base sheet is absent. The back sheet should be made of a material strong enough to withstand even being entwined with the embroidery threads. According to a conventional embroidering method, such a back sheet is laid under the base sheet after the base sheet is cut in a prescribed shape with scissors, a cutter, a blade, a water jet, plasma, or the like. The back sheet is arranged so as to be projected beyond the periphery of the base sheet or to be projected inside of or extending across an opening formed in the base sheet. Thus, embroidery is made across or along the periphery of the base sheet (or the periphery of the opening) and the projecting portion of the back sheet.

According to another conventional embroidering method, after the base sheet is arranged on the back sheet, only the base sheet is cut in a prescribed shape with scissors, a cutter, or the like. Thereafter, embroidery is made across or along the periphery of the cut base sheet and the back sheet projecting beyond the periphery (or across or long the periphery of the formed opening and the back sheet remaining inside of the opening). Then, the back sheet is finally removed leaving the embroidery along the periphery of the base sheet 5 (or along the periphery of the opening).

On the other hand, according to a conventional sewing method employed for manufacturing clothes, shoes, bags, etc., a base sheet of cloth, leather, or the like is cut in a complicated shape with scissors or the like and then the periphery of the cut base sheet is sewed together with another base sheet.

It has recently became practice to industrially carry out the above-described methods using industrial sewing machines. For example, in order to manufacture embroidery goods using a sewing machine, a base sheet, which is previously cut in a prescribed shape, is laid on a back sheet. Then, under such a condition, both of the base sheet and the back sheet are held in a sheet holding frame provided on a sewing machine table. Then, the sheet holding frame is moved directions in an X-Y plane (horizontal directions) in synchronization with vertical movement of a needle bar in the same manner as that of an ordinary embroidering method. As a result, embroidery can be made along the periphery of the base sheet or along the periphery of an opening formed in the base sheet.

As is described above, it is necessary to cut the base sheet in a prescribed shape prior to making embroidery. However, a conventional sewing machine itself fails to have a cutting system, so that the base sheet must be cut previously with scissors, a cutter, or the like, which causes a deterioration efficiency of operation. In addition, the thus cut base sheet must be accurately set in the sheet holding frame on the sewing machine table so that the periphery of the base sheet will correspond to a needle bar of a sewing machine head, which cause further deterioration of operation efficiency. Furthermore, it is not easy to manually cut the base sheet in a complicated shape. If a cutting device is employed for cutting the base sheet in a complicated shape, the manufacturing cost will be raised.

To overcome the above described problems, Japanese Patent KOKOKU No. 6-33550 discloses a sewing machine including a laser cutting system capable of cutting a sheet with laser light emitted from a cutting device controlled by a control section included in the sewing machine. According to such sewing machine, the cutting device is controlled on the basis of control signals for making stitches on the sheet. Therefore, the sheet is intermittently and two-dimensionally moved by a sheet feeder, while it is cut with laser light which is intermittently oscillated so as to synchronize with the intermittent movement of the sheet.

With such structure in which laser light is oscillated synchronization with the sheet feeder, the output level of the laser light is inevitably unstable due to the short time of the laser light oscillation. As a result, there is a possibility that the sheet may will be burned partially and/or that the sheet will not be cut successively and accurately. There arises another problem in that the periphery of the cut sheet becomes poor in appearance due to the unstable cutting operation.

Furthermore, as is described above, for making embroidery in an openwork pattern along the periphery of the base sheet (or along the periphery of the opening formed in the base sheet), it is necessary to arrange an back sheet under the base sheet so as to project beyond the periphery of the base sheet (or to project inside of or across the opening). In such case, only the base sheet should be cut prior to the embroidering process. However, according to the structure where the laser light is intermittently oscillated and therefore the output level of the laser light is the inevitably unstable, there is possibility that the base sheet will not be cut completely and/or that the back sheet will be cut partially or completely together with the base sheet.

SUMMARY OF THE INVENTION

An object of the present invention is to provide a sewing machine including a laser cutting system, in which a sheet holding frame is moved in directions in an X-Y plane in synchronization with vertical movement of a needle bar; the sewing machine being capable of successively moving a sheet held by the sheet holding frame, and accurately and smoothly cutting the sheet with stably oscillated laser light, thereby making the cut portion good in appearance.

Another object of the present invention is to provide a sewing machine including a laser cutting system capable of accurately cutting only a base sheet in a complicated shape while maintaining a back sheet laid thereunder uncut.

Still another object of the present invention is to provide a sewing machine including a laser cutting system capable of cutting only a base sheet laid on a back sheet, and automatically making embroidery along a periphery of the thus cut base sheet.

Still further another object of the present invention is to provide a sewing method or an embroidering method by which sewing or embroidery readily and accurately can be performed along a periphery of a sheet cut in a complicated shape or along a periphery of an opening formed in the sheet.

The sewing machine including a laser cutting system of the present invention includes a sewing machine table and a needle bar movable in a vertical direction at a prescribed position on the sewing machine table A; a sheet holding frame holds a sheet and is movable in directions in an X-Y plane on the sewing machine table in synchronization with the vertical movement of the needle bar. A laser oscillator for oscillates laser light capable of cutting the sheet held by the sheet holding frame on the sewing machine table. An optical system guides the laser light oscillated from the laser oscillator so as to be condensed on the sheet A control section is operable for stopping the laser oscillator from oscillating laser light, moving the needle bar in the vertical direction, and intermittently moving the sheet holding frame in the X-Y plane so as to synchronize with the vertical movement of the needle bar, or alternatively for stopping the vertical movement of the needle bar, successively moving the sheet holding frame in the X-Y plane and causing the laser oscillator successively to oscillate laser light.

In one embodiment, a plurality of sheets are held by the sheet holding frame, and the laser light oscillated from the laser oscillator is adjusted so as to have an output level capable of cutting an arbitrary number of at least one upper one of such sheets.

In one embodiment, the optical system includes a plurality of condensing lenses having different focus lengths, and the laser light oscillated from the laser oscillator is arbitrarily guided to pass through one of the plurality of condensing lenses.

The sewing method of the present invention includes a step of arranging a plurality of sheets so as to be overlapped with one another, a step of sewing the plurality of sheets together, and a step of cutting an arbitrary number of at least one upper one of such sheets with a prescribed output level of laser light.

According to another aspect, the sewing method of the present invention includes a step of arranging a plurality of sheets so as to be overlapped with one another; a step of cutting an arbitrary number of upper of such sheets with a prescribed output level of laser light while maintaining at least one of the sheets uncut, and a step of sewing the cut sheet or sheets and the uncut sheet together.

The embroidering method of the present invention includes a step of arranging a plurality of sheets so as to be overlapped with one another, a step of cutting an arbitrary number of at least one upper one of such sheets with a prescribed output level of laser light while maintaining at least one of the sheets uncut so as to project beyond a periphery of the cut sheet or sheets, a step of making embroidery across or along the periphery of the cut sheet or sheets and the projecting portion of the uncut sheet, and a step of removing the uncut sheet while leaving the embroidery along the periphery of the cut sheet or sheets.

In one embodiment, the embroidering method further includes a step of sewing the plurality of sheets together prior to the cutting step.

For cutting the sheet using the sewing machine of the present invention, the control section cause the sheet holding frame successively to be moved in the X-Y plane (horizontal direction or directions) under a condition where the vertical movement of the needle bar is stopped. Then, the control section cause the laser oscillator to oscillate a prescribed output level of laser light so as to synchronize with the successive movement of the sheet holding frame. Thus, the sheet holding frame is successively moved in the X-Y plane so as to draw a prescribed shape on the sewing machine table. While the sheet holding frame is moved, the optical system makes the thus oscillated laser light condense on a desired spot of the sheet held by the sheet holding frame. As a result, the sheet held by the sheet holding frame can accurately be cut in a prescribed shape with the laser light.

For making sewing or embroidery on the sheet held by the sheet holding frame using the sewing machine of the present invention, the control section stops the laser oscillator from oscillating laser light. Under such a condition, the needle bar is vertically moved, and the sheet holding frame is intermittently moved in the X-Y plane in synchronization with the vertical movement of the needle bar. Thus, sewing or embroidery can be made on the sheet held by the sheet holding frame.

For cutting the sheet in a prescribed shape and then making sewing or embroidery along the periphery of the cut sheet using the sewing machine of the present invention, a plurality of sheets, which are overlapped with one another, are held by the sheet holding frame. Under such a condition, the control section stops the vertical movement of the needle bar. Then, the sheet holding frame is successively moved in the X-Y plane and laser light is successively oscillated from the laser oscillator. The thus oscillated laser light, which is adjusted so as to have an output level capable of cutting only upper sheet(s), is condensed on the upper sheet(s). Therefore, only the upper sheet(s) can be successively cut with the laser light according as the sheet holding frame is successively moved in the X-Y plane. Consequently, the lower sheet(s), which remain uncut, inevitably projecting beyond the periphery of the cut upper sheet(s).

After the upper sheet(s) are cut in a prescribed shape, the control section stops the oscillation of laser light and moves the needle bar in the vertical direction. Finally, the sheet holding frame is intermittently moved in the X-Y plane in synchronization with the vertical movement of the needle bar. The sheet holding frame is intermittently moved so that the needle bar corresponds to the periphery of the upper sheet(s), thereby making sewing or embroidery across along the periphery of the cut upper sheet(s) and the projecting portion of the uncut lower sheet(s).

After the embroidery is made along the periphery of the upper sheet(s), the lower sheet(s) are finally removed, thus leaving the embroidery along the periphery of the upper sheet(s).

According to the present invention, the laser light oscillated from the laser oscillator may have an arbitrary output level, and therefore, it is possible to adjust the laser light output level so as to cut an arbitrary number of upper sheets. Furthermore, it is also possible to adjust the laser light output level so as not to cut the sheet but to leave burn marks of laser light on the sheet so as to make a desired design, character, or the like.

The sewing machine of the present invention may be provided with a plurality of condensing lenses having different focus lengths. In such case, a condensing lens 0 having a shorter focus length preferably is employed for cutting the sheet with more accuracy, while a condensing lens having a longer focus length preferably is employed for leaving burn marks at a prescribed area of the sheet surface to make a design or the like.

The above and further objects, features and advantages of the invention will more fully appear from the following description with reference to the accompanying drawings. It is to be expressly understood, however, that the drawings are for purpose of illustration only and are not intended as a definition of the limits of the invention.

DETAILED DESCRIPTION OF THE PREFERRED EMBODIMENTS

Hereinafter, the present invention will be described in detail by way of illustrative examples with reference to drawings.

EXAMPLE 1

Figure 1:
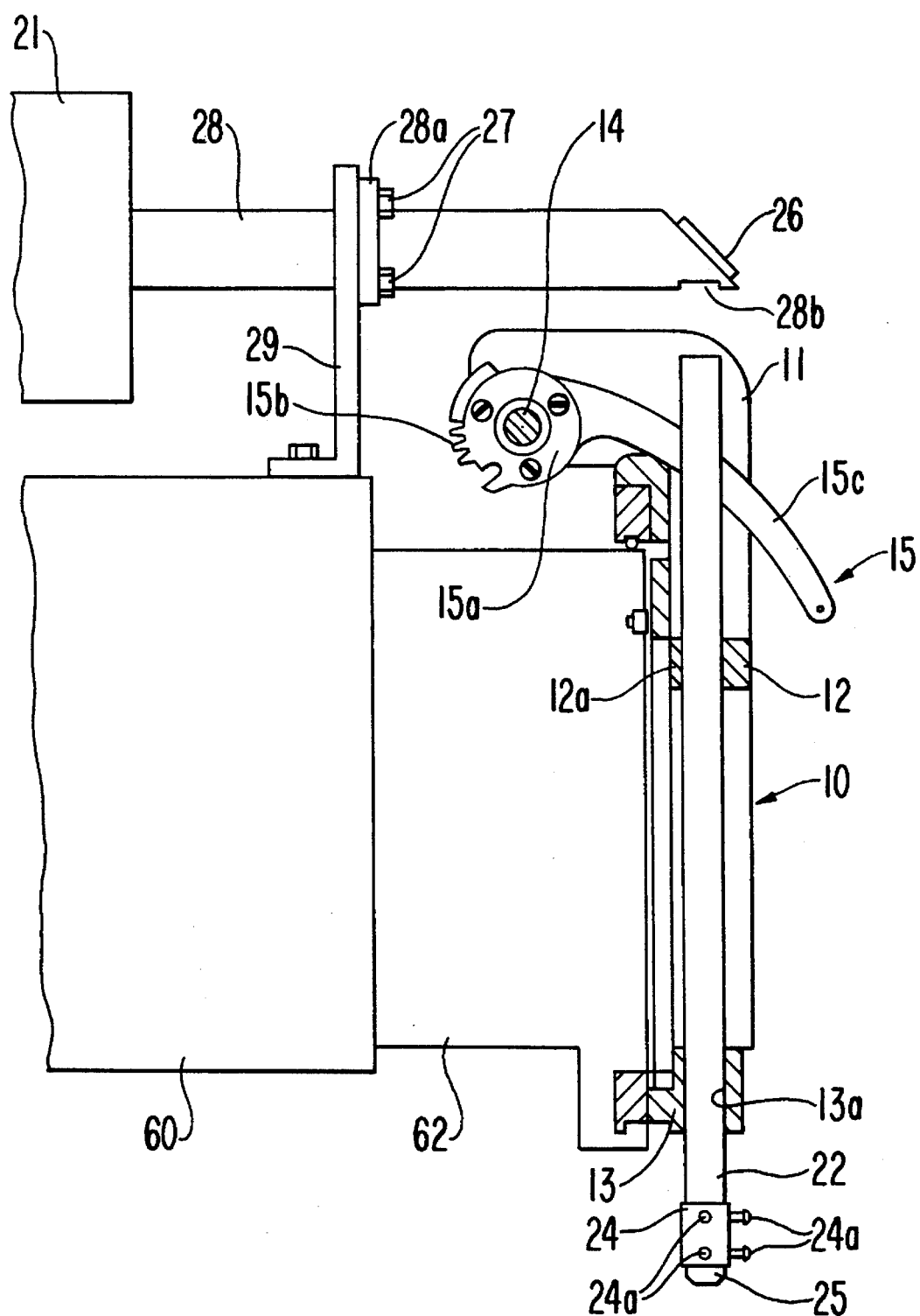
FIG. 1 is a partially sectioned cutaway side view of a sewing machine including a laser cutting system according to a first example of the present invention.
Figure 2:
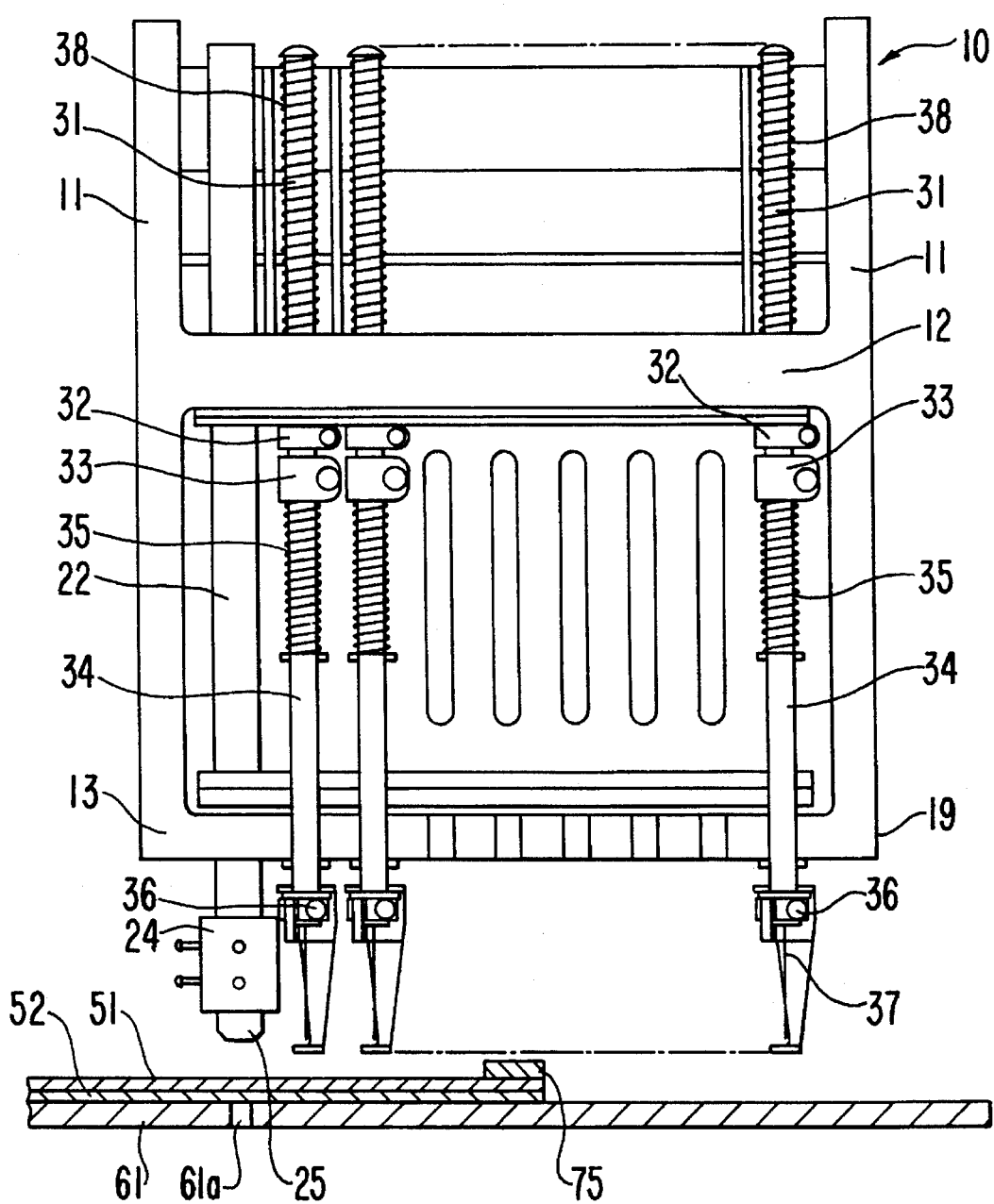
FIG. 2 is a partially sectioned front view of a sewing machine head included in the sewing machine of FIG. 1

FIG. 1 is a cutaway side view for a sewing machine including a laser cutting system according to a first example of the present invention. FIG. 2 is a cutaway front view of a sewing machine head included in the sewing machine of FIG. 1. The sewing machine of the present example includes a sewing machine body 60, a sewing machine table 61 arranged substantially horizontally, a slide rail 62 mounted on the sewing machine body 60 so as to be located above the sewing machine table 61, a sewing machine head 10 slidably supported by the slide rail 62, and a sheet holding frame 75 arranged on the sewing machine table 61. The sheet holding frame 75 is illustrated schematically and is to be used for horizontally holding a base sheet 51 of cloth, leather, or the like to have embroidery on the periphery together with a back sheet 52 to entwine with embroidery threads. The back sheet 52 is laid under the base sheet 51. The sheet holding frame 75 is moved in directions in an X-Y plane (horizontal directions) on the sewing machine table 61 while holding the thus overlapped base sheet 51 and the back sheet 52.

The sewing machine head 10 includes a slide case 19 constructed of a pair of vertically arranged supporting frames 11, a central frame 12 horizontally arranged so as to connect almost central portions of the two supporting frames and a lower frame 13 arranged so as to connect the lower end portions of the two supporting frames The central frame 12 of the sewing machine head 10 has therethrough an arbitrary number (for example, nine) of apertures 12a pretending in a vertical direction. The apertures 12a are horizontally arranged at regular intervals. The lower frame 13 also includes the same number of apertures 13a as that of the apertures 12a. Among the apertures 12a and 13a, ones located at the leftmost side of FIG. 2 are used for receiving a longitudinal guide pipe 22, and the other ones are used for receiving needle bars 31. As shown in FIG. 2, the longitudinal guide pipe 22 for vertically guiding laser light and is inserted through and supported at the respective apertures 12a and 13a located at the leftmost side of FIG. 2.

In addition, a laser oscillator 21 and a transverse guide pipe 28 are arranged above the sewing machine body 60. The laser oscillator 21 oscillates, for example, a carbon dioxide laser having an output level of about 10 to 20 W in an almost horizontal direction crossing the slide rail 62 at right angles. The laser light oscillated from the laser oscillator 21 is to be horizontally guided toward a reflecting mirror (described later) through the transverse guide pipe 28 and then be vertically guided downward through the longitudinal guide pipe 22.

As shown in FIG. 1, a flange part 28a is provided so as to surround an outer circumferential surface of an almost central portion of the transverse guide pipe 28. The flange part 28a is provided with three long holes which are arranged in a circumferential direction of a concentric circle centering about the axis of the transverse guide pipe 28. The flange part 28a is attached to a bracket 29 mounted on the upper surface of the sewing machine body 60 by means of slidably inserting three bolts 27 in the respective long holes. Each bolt 27 is slidably inserted in the respective long hole, so that the transverse guide pipe 28 can be rotated around the axis thereof by means of loosening each bolt 27.

The leading end portion of the transverse guide pipe 28 is located above the sewing machine head 10 which is slidable along the slide rail 62. The leading end portion of the transverse guide pipe 28 has an inclined surface inclined at about 45° with respect to the horizontal. The inclined surface is provided with a reflecting mirror 26 to reflect the laser light oscillated from the laser oscillator 21 downward. The laser light reflected by the reflecting mirror 26 is guided downward through an opening 28b provided at the lower circumferential surface of the leading end portion of the transverse guide pipe 28. Below the opening 28b, the longitudinal guide pipe 22 is vertically mounted on the sewing machine head 10 as is described previously.

The longitudinal guide pipe 22, which is made of stainless steel or the like, is extended through the lower frame 13 and the central frame 12 up to the vicinity of the leading end portion of the transverse guide pipe 28. Thus, the laser light, which is oscillated from the laser oscillator 21 and is reflected by the reflecting mirror 26, can be introduced into the longitudinal guide pipe 22 and guided downward therethrough.

Figure 3:
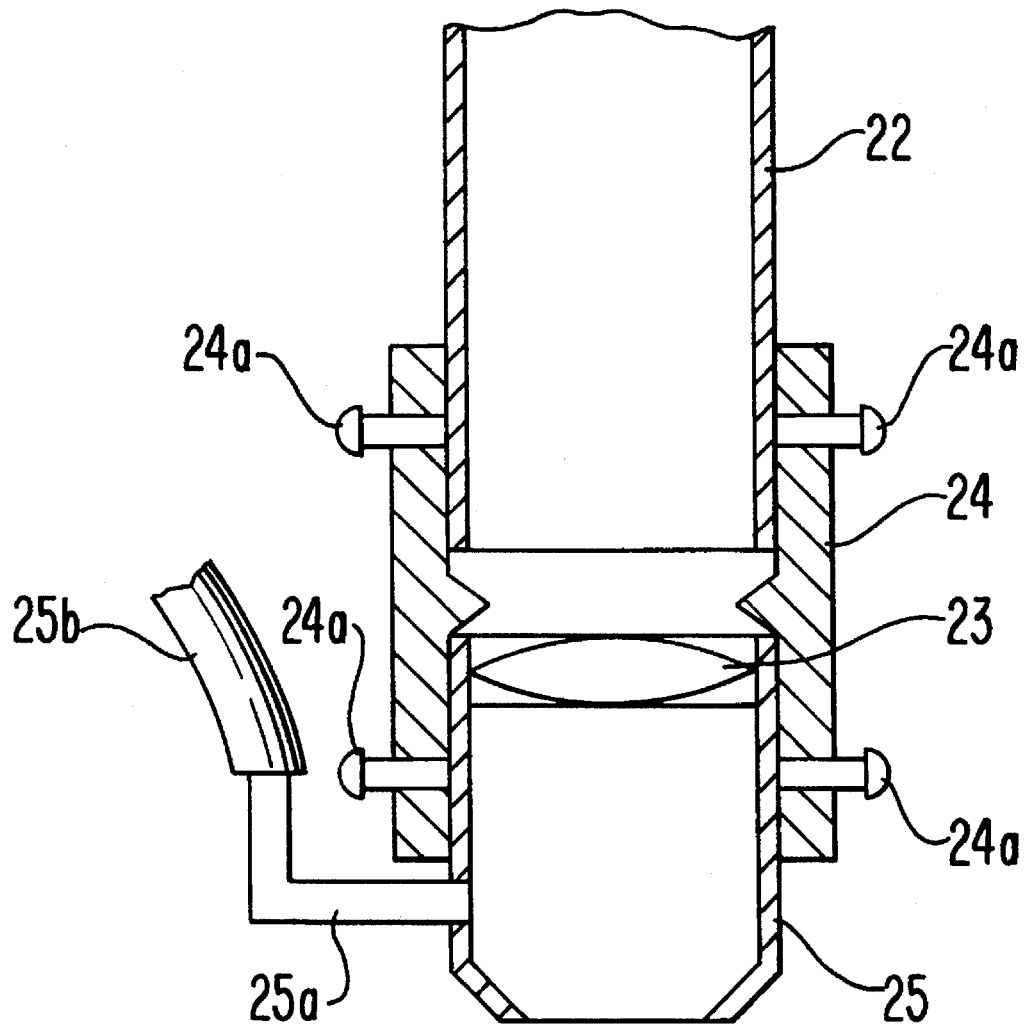
FIG. 3 is a cross-sectional view of a lens holder and a connecting member connected to a lower end portion of a longitudinal guide pipe provided in the sewing machine head of FIG. 2.

The lower end portion of the longitudinal guide pipe 22, which is located below the lower frame 13, is connected to a lens holder 25 via a cylindrically shaped connecting member 24. FIG. 3 is a cross-sectional view showing the lens holder 25 and the connecting member 24 provided at the lower end portion of the longitudinal guide pipe 22. The lens holder 25 has a cylindrical shape having an outer diameter equivalent to that of the longitudinal guide pipe 22. As shown in FIG. 3, a condensing lens 23 is horizontally arranged at the upper end portion of the lens holder 25. The condensing lens 23 is arranged so that the laser light introduced into the longitudinal guide pipe 22 can be condensed on a desired spot on the base sheet 51 arranged on the sewing machine table 61. The lower end portion of the lens holder 25 has a circular truncated cone shape with an in outer diameter converging downwardly.

As shown in FIG. 3, an air supply tube 25a is mounted on a wall surface (between a the central portion and the lower end portion) of the lens holder 25. The air supply tube 25a is provided with a flexible air tube 25b for receiving compressed air. With such a structure, compressed air can be jetted inside the lens holder 25 via the air supply tube 25a, there cooling the condensing lens 23 and removing dirt, dust, and the like therefrom.

The connecting member 24 has a cylindrical shape so as to fit on the lower end portion of the longitudinal guide pipe 22 and the upper end portion of the lens holder 25. With such a shape, the connecting member 24 is connected to the lower end portion of the longitudinal guide pipe 22 and the upper end portion of the lens holder 25 with a plurality of screws 24a.

As is described above, the central frame 12 has a plurality of apertures 12a, and the longitudinal guide pipe 22 is inserted through the aperture 12a located on the leftmost side of FIG. 2. The other apertures 12a each receive a respective needle bar 31. Each needle bar 31 inserted through an aperture 12a is also inserted through a corresponding aperture 13a. The upper portion of the needle bar 31, which is projected from upwardly the central frame 12, is provided with a compression coiled spring 38. The needle bar 31 is depressed by the compression coiled spring 38.

The needle bar 31 is provided with an upper dead point stopper 32 immediately below the central frame 12, and is also provided with a needle bar holder 33 therebelow. Furthermore, a presser foot 34 is arranged so as to extend vertically from a point between the central frame and the lower frame 13 to a point below the lower end portion of the needle bar 31. The upper end portion of the presser foot 34 is fitted on the needle bar 31. The presser foot 34, which is not inserted through the aperture 13a but is passed in front of the aperture 13a, is again fitted on the needle bar 31 at the lower portion and is further extended downward. At the lower end portion of the needle bar 31, a needle 37 is supported by a needle holder 36 and is extended downwardly. The needle bar 31 is vertically moved so that the needle 37 may be vertically moved passing through the presser foot 34.

The needle bar 31 is also provided with a compression coiled spring 35 between the needle bar holder 33 and the presser foot 34, thereby depressing the presser foot 34 downwardly.

The longitudinal guide pipe 22 or one of the needles 37 arbitrary can be brought to face to a hole 61a provided in the sewing machine table 61 by means of sliding the sewing machine head 10 with respect to the sewing machine table 61.

Referring again to FIG. 1, the upper end portion of each supporting frame 11 is extended toward the sewing machine body (toward the rear side). A balance shaft 14 is horizontally provided so as to connect each leading end portion of the thus extended upper end portions of the two supporting frames 11. A balance 15 is provided for each needle bar 31. Herein, eight balances 15 each including a cylindrical end portion 15a are provided for the respective eight needle bars 31 so that the eight end portions 15a may be spaced in the axial direction of the balance shaft 14. Each balance 15 also includes an arm section 15c extending from the end portion 15a toward the front side. In addition, a gear 15b is provided at the rear side of an outer peripheral surface of the end portion 15a.

A prescribed color of embroidery thread is hooked on a leading end portion of each arm section 15c, and is threaded through the needle 37 provided at the lower end portion of the needle bar 31 corresponding to the balance 15.

Figure 4:
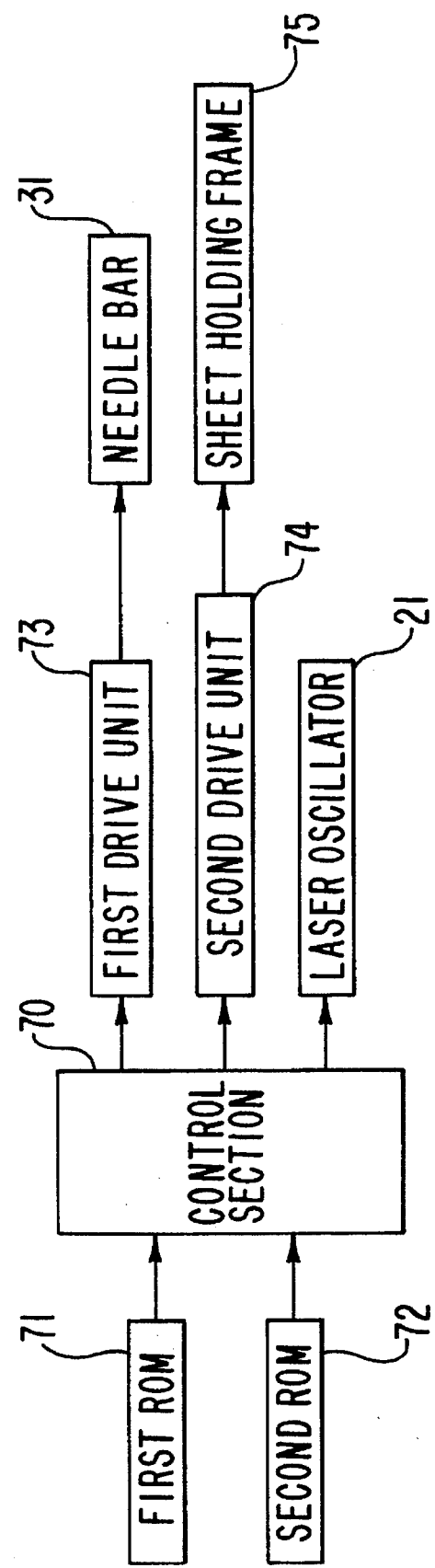
FIG. 4 is a block diagram of a control section of a sewing machine including a laser cutting system of the present invention.

Hereinafter, a control system for a sewing machine including a laser cutting system of the present invention will be described with reference to a block diagram of FIG. 4. As shown in FIG. 4, a first drive unit 73 for driving a needle bar 31 in a vertical direction, a second drive unit 74 for driving sheet holding frame 75 in the X-Y plane, and a laser oscillator 21 for oscillating laser light are controlled by a control section 70 using a microcomputer or the like. The control section 70 selectively reads out a control signal recorded in a first ROM 71 (Read Only Memory) for performing an embroidering process or a second ROM 72 foe performing a cutting process, and then controls the first drive unit 73, the second drive unit 74, and the laser oscillator 27 on the basis of the selected control signal.

Next, the embroidering process of the present invention will be described. First, one of the needle bars 37 is brought so as to face the hole 67a on the sewing machine table 67, and then the control section 70 reads out a control signal recorded in the first ROM 71 for performing the embroidering process. On the basis of the read control signal, the laser oscillator 21 stops oscillating and the first drive unit 73 drives the needle bar 31 in the vertical direction. Then, the second drive unit 74 intermittently drives the sheet holding frame 75 in the X-Y plane on the sewing machine table 67 in synchronization with the vertical movement of the needle bar 37. Thus, embroidery can be made on the base sheet 51 held by the sheet holding frame 75 with the needle 37 provided at the lower end portion of the needle bar 37.

Next the cutting process of the present invention will be described. First, the condensing lens 23 provided at the lower portion of the longitudinal guide pipe 22 is brought so as to face the hole 67a on the sewing machine table 61. Then, the control section 70 reads out a control signal recorded in the second ROM 72 for performing the cutting process. On the basis of the read control signal, the first drive unit 73 stops the vertical movement of the needle bar 31 and the second drive unit 74 successively drives the sheet holding frame 75 in the X-Y plane on the sewing machine table 67. At the same time, a prescribed output level of laser light is successively oscillated from the laser oscillator 21. Thus, the prescribed output level of laser light is successively condensed on the base sheet 51 held by the successively moved sheet holding frame 75 on the sewing machine table 61.

Such a sewing machine is preferably used for making embroidery along a periphery of an opening formed or to be formed in the sheet, and a method for making such embroidery row will be described.

First, the base sheet 51 is laid on the back sheet 52, and then both of the base sheet 51 and the back sheet 52 are held by the sheet holding frame 75. Then, the sewing machine head 10 slides with respect to the sewing machine 5 table 61 so that the needle bar 31 having a desired color of embroidery thread, faces to the hole 61a on the sewing machine table 61.

Thereafter, the control section 70 reads out a control signal recorded in the first ROM 71 for performing the embroidering process. On the basis of such control signal, the laser oscillator 21 stops oscillating, and the first drive unit 73 drives the needle bar 31 in the vertical direction. Then, the second drive unit 74 intermittently drives the sheet holding frame 75 in the X-Y plane synchronization with the vertical movement of the needle bar 31. A trace of a seam to be made on the periphery of the opening to be formed in the base sheet 51 is previously recorded in the first ROM 71. The trace of the seam is recorded as a set of relatively longer straight lines in the X-Y plane.

As is well known, during a time when the needle bar 31 is raised and the needle 37 is located above the base sheet 51, the sheet holding frame 75 is linearly moved in the X-Y plane. On the other hand, during a time when the needle bar 31 is lowered and the needle 37 pierces through the base sheet 51 and the back sheet 52, the movement of the sheet holding frame V5 is stopped. When the needle 3V pierces through the base sheet 51 and the back sheet 52, the embroidery thread threaded through the needle 37 is entwined with a bobbin thread (not shown). Thus, the base sheet 51 and the back sheet 52 can be sewn together along the periphery of the opening to be formed in the base sheet 51.

After the base sheet 51 and the back sheet 52 are sewn together, the sewing machine head 10 is slides with respect to the sewing machine table 61 so that the longitudinal guide pipe 22 faces to the hole 61a on the sewing machine table 61. Thereafter, the control section 70 reads out a control signal recorded in the second ROM 72 for performing the cutting process. A trace of the sheet holding frame 75 to be moved on an inner side of the seam (which is made along the periphery of the opening to be formed as is described above) is previously recorded in the second ROM 72. The trace of the sheet holding frame 75 is recorded as a set of relatively shorter straight lines. Accordingly, the trace of the sheet holding frame 75 recorded in the second ROM 72 can realize smoother movement of the sheet holding frame 75 along the periphery of the opening to be formed in the base sheet 51.

The control section 70 controls the second drive unit 74 so that the sheet holding frame 75 can successively be moved in the X-Y plane on the basis of the trace recorded in the second ROM 72. At the same time, the control section 70 controls the laser oscillator 21 so that a prescribed output level of laser light can successively be oscillated.

The output level of laser light is previously adjusted so that only the base sheet 51 is cut while the back sheet 52 remains uncut. After the thus adjusted laser light is successively oscillated, it is introduced into the transverse guide pipe 28 and the longitudinal guide pipe 22, and is condensed on the base sheet 51 through the condensing lens 23 provided at the lower portion of the longitudinal guide pipe 22.

The laser light condensing on the base sheet 51 is successively moved along stitches of the seam made on the base sheet 51 and the back sheet 52. As a result, only the base sheet 51 is successively cut with the laser light, and the cut portion is removed, thereby forming an opening in a prescribed shape. As is described above, the laser light is adjusted so as not to cut the back sheet 52, and therefore the back sheet 52 still remains inside of or extends across the opening formed in the base sheet 51.

The laser light oscillated from the laser oscillator 21 is safely prevented by the transverse guide pipe 28 and the longitudinal guide pipe 22 from escaping to the outside. In addition, the laser light itself is prevented by the guide pipes 28 and 22 from being adversely affected by exterior dust or the like.

During the cutting process, compressed air is supplied to the lens holder 25 via the air supply tube 25a, thereby cooling the condensing lens 23. In addition, the compressed air prevents dust or the like generated during the cutting process from being attached to the condensing lens 23.

Thus, the base sheet 51 can smoothly be cut with the laser light successively oscillated from the laser oscillator 21, thereby making the cut edge good in appearance.

In order to absorb smoke generated when the base sheet 51 is cut with the laser light, a suction port of an appropriate suction device (not shown) may be provided in the vicinity of the lower portion of the lens holder 25.

After the opening is formed in the base sheet 51, the sewing machine head 10 slides so that the needle bar having a desired color of embroidery thread is brought to face the hole 61a on the sewing machine table 61. At the same time, the sheet holding frame 75 is moved in the X-Y direction so that the needle bar 31 may be located above a prescribed position of the periphery of the opening formed in the base sheet 51.

Thereafter, the control section 70 reads out a control signal recorded in the first ROM 71. On such basis of the control signal, the laser oscillator 21 stops oscillating laser light, and the first drive unit 73 drives the needle bar 31 in the vertical direction. Then, the sheet holding frame 75 is linearly moved in the X-Y plane so that embroidery can be made across or along the periphery of the opening with the back sheet 52 remaining inside of the opening. The sheet holding frame 75 is intermittently moved in synchronization with the vertical movement of the needle bar 31. As is described above, the sheet holding frame 75 is linearly moved in the X-Y plane when the needle bar 31 is raised. On the other hand, the sheet holding frame 75 is stopped from moving when the needle bar 31 is lowered. Finally, embroidery can be made across or along the periphery of the opening of the base sheet 51 with the back sheet 52 remaining inside of the opening, with desired colors of embroidery threads.

The intermittent horizontal movement of the sheet holding frame 75 during the embroidering process is determined on the basis of the successive horizontal movement of the sheet holding frame 75 during the cutting process, so that the needle bar 31 can accurately be moved along the periphery of the opening formed by the cutting process. According to such a structure where the back sheet 52 remains inside of the opening formed in the base sheet 51, the embroidery thread can be entwined with the back sheet 52 remaining inside of the opening, thereby making embroidery entirely along the periphery of the opening.

After the embroidery is made across or along the periphery of the opening, with the back sheet 52 remaining inside of the opening, the back sheet 52 is finally removed from the base sheet 51, thus leaving the embroidery along the periphery of the opening.

The sewing together threads used for sewing the base sheet 51 and the back sheet 52 are hidden by the embroidery threads used on the periphery of the opening, so that there is little possibility that the sewing threads may adversely affect the appearance of the resulting embroidery. However, the sewing threads are desired to have the same color as that of the embroidery threads, thereby further lessening the possibility that the sewing threads will be noticed.

According to the sewing machine including the laser cutting system of the present invention, it is possible to make embroidery in a complicated pattern such as a scallop pattern along a periphery of an opening formed in the base sheet. The present invention can be applied not only to cloth but also to leather, synthetic leather, and the like as long as the needle can pierce therethrough.

The present invention is described above by way of illustrating a sewing machine provided with a plurality of needle bars, but it can also be applied to a sewing machine provided with only one needle bar. In such case, initially, two sheets are overlapped with each other and held by the sheet holding frame on the sewing machine table. Next, the two sheets are sewn together so as to make a seam thereon in a prescribed shape. Thereafter, only the upper sheet is cut with laser light along the seam. Thus, the present invention makes it possible to sew a sheet together with another sheet cut in a prescribed shape.

The present invention may also be employed only for a cutting process or only for an embroidering process. In a case where a heavy sheet such as heavy cloth and leather is employed as the base sheet, it is also possible to leave burn marks of laser light on the base sheet so as to make a desired design, character, or the like by means of adjusting output level of the oscillated laser light. Such an operation is performed in the same manner as that of the above cutting process, that is, the sheet holding frame 75 is successively moved in the X-Y plane and the laser light is successively oscillated according to the successive movement of the sheet holding frame 75, which makes it possible to leave burn marks of laser light so as to draw smooth lines or curves. Thus, it is possible to draw a complicated design, character, or the like with burn marks as desired. It is also possible to leave burn marks at a prescribed area at uniform thickness using the successively oscillated laser light and the successively moved sheet holding frame of the present invention.

EXAMPLE 2

Figure 5:
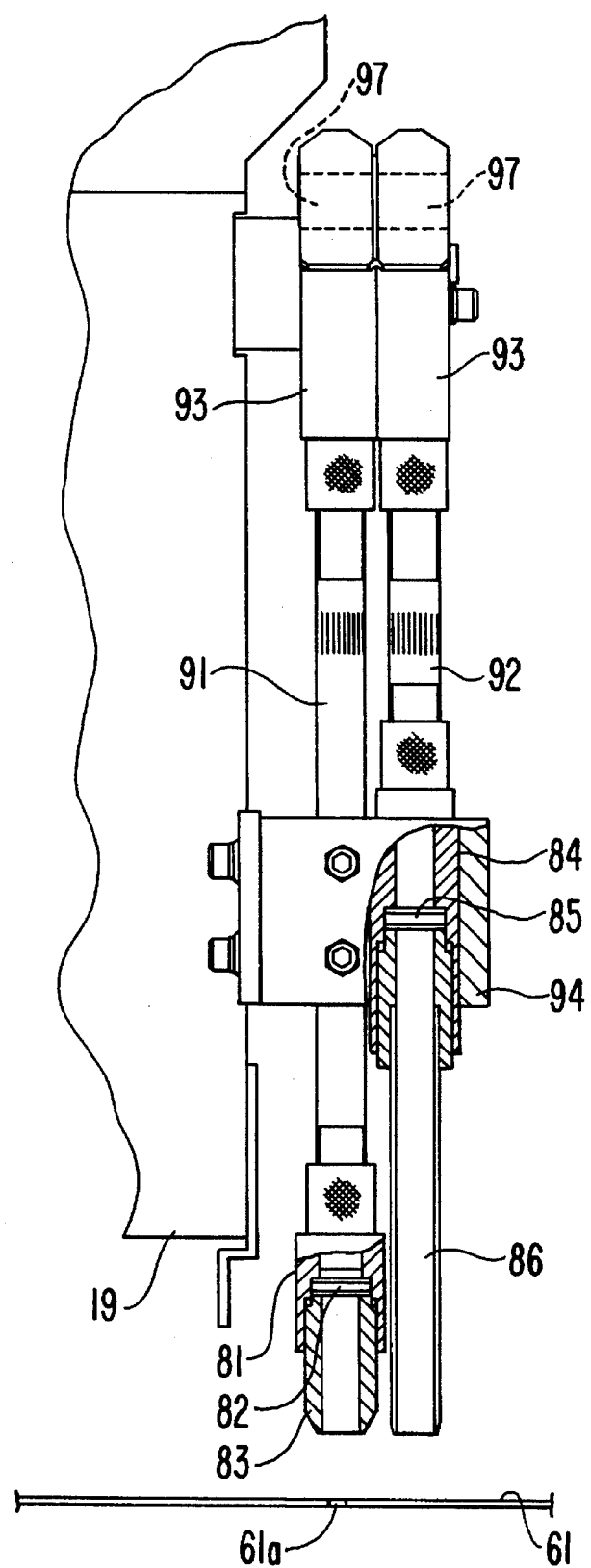
FIG. 5 is a partially sectioned front view of a sewing machine including a laser cutting system according to a second example of the present invention.
Figure 6:
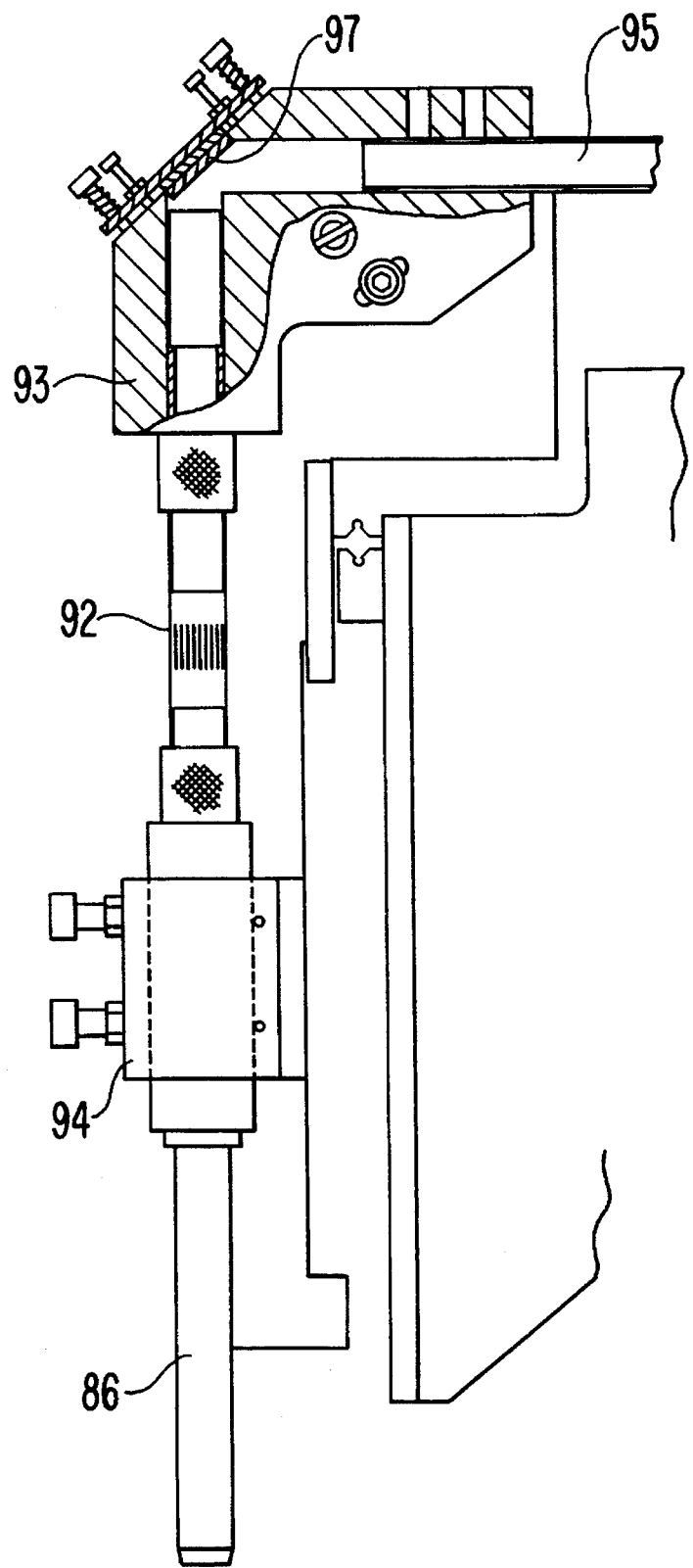
FIG. 6 is a partially sectioned side view of the sewing machine of FIG. 5.

Hereinafter, a second example of the present invention will be described with reference to FIGS. 5 and 6. FIG. 5 is a cutaway front view of a sewing machine including a laser cutting system according to the second example of the present invention. FIG. 6 is a cutaway side view of the sewing machine of FIG. 5.

According to the second example, a pair of longitudinal guide pipes 91 and 92 for vertically guiding laser light are arranged outside of a slide case 19 of a sewing machine head 10. The upper end portions of the longitudinal guide pipes 91 and 92 are each supported by the upper portion of the slide case 19 via respective upper supporting blocks 93. On the other hand, the central portion of the longitudinal guide pipe 91 and the lower end portion of the other longitudinal guide pipe 92 are each supported by the central portion of the slide case 19 via a lower supporting block 94.

In the same manner as that of the first example, a pair of transverse guide pipes 95 for horizontally guiding laser light is horizontally supported by the respective upper supporting blocks 93. Each upper supporting block 93 is provided with reflecting mirrors 97 for reflecting the laser light guided from the transverse guide pipe 95 to the longitudinal guide pipe 91 or 92.

The longitudinal guide pipe 91, which is supported by the lower supporting block 94 at the central portion, is extended to the vicinity of sewing machine table 61, and is provided with a lens holder 81 at the lower end portion. The lens holder 81 horizontally holds a condensing lens 82 having a relatively shorter focus length, such as 50 mm. Below the condensing lens 82, a hood 83 is vertically supported by the lens holder 81.

The other longitudinal guide pipe 92, which is supported by the lower supporting block 94 at the lower end portion, is connected to a lens holder 84 which is also supported by the lower supporting block 94. The lens holder 84 horizontally holds a condensing lens 85 having a relatively longer focus length, such as 127 mm. Below the condensing lens 85, a hood 86, which is vertically supported by the lens holder 84, is extended to the vicinity of the sewing machine table 61.

According to such a structure, the slide case 19 slides so that either one of the condensing lenses 82 and 85 may be arbitrarily brought to face hole 61a formed in the sewing machine table 61. When the condensing lens 82 or 85 is brought to face hole 61a, the laser light oscillated from a laser oscillator (not shown) is guided through the corresponding transverse guide pipe 95. The thus guided laser light is reflected by the reflecting mirror 97 so as to be introduced into the corresponding longitudinal guide pipe 91 or 92.

Then, the laser light is condensed on a desired spot on a sheet held by a sheet holding frame (not shown) through the condensing lens 82 or 85.

According to the present example, it is possible to condense laser light on a smaller spot with higher intensity by employing the condensing lens 82 having a shorter focus length. On the other hand, it is also possible to condense laser light on a larger spot with relatively uniform intensity by employing the condensing lens 85 having a longer focus length. Thus, the condensing lens 82 is preferably used for cutting the sheet held by the sheet holding frame in a prescribed shape. On the other hand, the condensing lens 85 is preferably used for leaving burn marks on a prescribed area of the sheet.

As is described above, according to the present invention, the sewing or embroidering process is performed by intermittently moving the sheet holding frame in the X-Y plane. On the other hand, the cutting process is performed by successively moving the sheet holding frame while successively oscillating laser light. Therefore, the sheet held by the sheet holding frame can be cut with high accuracy and with smooth cutting edges. In addition, it is also possible to hold a plurality of sheets by the sheet holding frame and to cut an arbitrary number of such sheets while at least one of such sheets remain uncut. Furthermore, the present invention makes it possible to leave burn marks of laser light on the sheet surface so as to draw a desired pattern.

According to the embroidering method of the present invention, it is possible to sew together an upper sheet and a lower sheet, and then to cut only the upper sheet with laser light. Thus, sewing goods in which a complicated shape of sheet is sewn together with a desired portion of another sheet can be readily manufactured. In addition, according to the embroidering method of the present invention, embroidery can be made in an openwork pattern or the like along the periphery of the sheet with high accuracy and with high operating efficiency.

The sewing method and the embroidery method of the present invention can be readily carried out using the sewing machine including the laser cutting system of the present invention.

Various other modifications will be apparent to and can be readily made by those skilled in the art without departing from the scope and spirit of the present invention. The scope of the present invention is therefore to be limited only by the claims appended hereto.

What is claimed is:

1. A sewing machine including a laser cutting system comprising:

a sewing machine table;

a needle bar movable in a vertical direction at a prescribed position on said sewing machine table;

a sheet holding frame for holding a sheet, said frame being movable in directions in an X-Y plane on said sewing machine table in synchronization with the vertical movement of said needle bar;

a laser oscillator for oscillating laser light capable of cutting the sheet held by said sheet holding frame on said sewing machine table;

an optical system for guiding the laser light oscillated from said laser oscillator so as to be condensed on the sheet; and a control section for stopping said laser oscillator from oscillating laser light, moving said needle bar in the vertical direction, and intermittently moving said sheet holding frame in said X-Y plane so as to synchronize with the vertical movement of said needle bar, or alternatively for stopping the vertical movement of said needle bar, successively moving said sheet holding frame in said X-Y plane, and causing said laser oscillator to successively oscillate laser light.

2. A sewing machine including a laser cutting system according to claim 1, wherein said sheet holding frame is operable to hold a plurality of sheets, and the laser light oscillated from said laser oscillator is adjustable so as to have an output level capable of cutting an arbitrary number of the sheets.

3. A sewing machine including a laser cutting system according to claim 1, wherein said optical system includes a plurality of condensing lenses at least two of which have respective focus lengths which differ from each other, and the laser light oscillated from said laser oscillator is arbitrarily guidable so as to pass through one of said plurality of condensing lenses.

4. An embroidering method comprising:

arranging a plurality of sheets so as to be overlapped with one another;

cutting an arbitrary number of at least one upper one of said sheets with a prescribed output level of laser light while maintaining at least one of said sheets uncut so as to project beyond a periphery of the cut sheet;

making embroidery along said periphery of the cut sheet and the projecting portion of the uncut sheet; and removing said uncut sheet while leaving said embroidery along said periphery of said cut sheet.

5. An embroidering method according to claim 4, further comprising sewing together said plurality of sheets prior to said cutting.

* * * * *